(12) United States Patent
Min

(10) Patent No.: US 9,052,738 B2
(45) Date of Patent: Jun. 9, 2015

(54) ACTIVE CONTROL METHOD AND SYSTEM OF PEDAL EFFORT FOR ACCELERATOR

(71) Applicants: Hyundai Motor Company, Seoul (KR); Kia Motors Corporation, Seoul (KR)

(72) Inventor: Jeong Seon Min, Gwangju (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 120 days.

(21) Appl. No.: 13/945,337

(22) Filed: Jul. 18, 2013

(65) Prior Publication Data

US 2014/0309859 A1 Oct. 16, 2014

(30) Foreign Application Priority Data

Apr. 10, 2013 (KR) ........................ 10-2013-0038923

(51) Int. Cl.
*G05G 1/40* (2008.04)
*B60K 26/02* (2006.01)
*G05G 5/03* (2008.04)
*G05G 1/44* (2008.04)

(52) U.S. Cl.
CPC ................ *G05G 1/40* (2013.01); *B60K 26/021* (2013.01); *G05G 1/44* (2013.01); *G05G 5/03* (2013.01)

(58) Field of Classification Search
CPC ....................................................... G05G 1/40
See application file for complete search history.

(56) References Cited

U.S. PATENT DOCUMENTS

| | | | |
|---|---|---|---|
| 6,312,039 B1* | 11/2001 | Bartz | 296/75 |
| 2002/0161487 A1* | 10/2002 | Kojima et al. | 701/1 |
| 2006/0041359 A1* | 2/2006 | Ohtsubo et al. | 701/45 |
| 2006/0219048 A1* | 10/2006 | Ueno | 74/560 |
| 2007/0038336 A1* | 2/2007 | Yamamura et al. | 701/1 |
| 2008/0306658 A1* | 12/2008 | Beisheim et al. | 701/46 |
| 2009/0088930 A1* | 4/2009 | Ohtsubo et al. | 701/49 |
| 2014/0294240 A1* | 10/2014 | Hong et al. | 382/104 |
| 2014/0309857 A1* | 10/2014 | Min et al. | 701/36 |
| 2014/0309859 A1* | 10/2014 | Min | 701/36 |

FOREIGN PATENT DOCUMENTS

| | | |
|---|---|---|
| JP | H07-125615 A | 5/1995 |
| JP | 2005-289129 A | 10/2005 |
| JP | 2005-301441 A | 10/2005 |
| JP | 2006-076376 A | 3/2006 |
| KR | 20-1998-0022317 U | 7/1998 |
| KR | 20-0416918 Y1 | 5/2006 |
| KR | 10-2010-0063453 | 6/2010 |
| KR | 10-2010-0063453 A | 6/2010 |

* cited by examiner

*Primary Examiner* — Helal A Algahaim
*Assistant Examiner* — Kelly D Williams
(74) *Attorney, Agent, or Firm* — Mintz Levin Cohn Ferris Glovsky and Popeo, P.C.; Peter F. Corless

(57) ABSTRACT

An active control method and system of varying a pedal effort for an accelerator through which the pedal effort for an accelerator is actively varied based on the locations of the accelerator.

14 Claims, 6 Drawing Sheets

ACTIVE CONTROL METHOD AND SYSTEM OF PEDAL EFFORT FOR ACCELERATOR

CROSS-REFERENCE TO RELATED APPLICATION

This application claims under 35 U.S.C. §119(a) the benefit of Korean Patent Application No. 10-2013-0038923 filed Apr. 10, 2013, the entire contents of which are incorporated herein by reference.

BACKGROUND (a) Technical Field

The present invention relates to an active control method and system of pedal effort for an accelerator, and more particularly, to an active control method and system of pedal effort for an accelerator capable of actively varying the pedal effort for an accelerator based on locations of a driver seat in an accelerator provided with a pedal effort control module.

(b) Background Art

An organ type accelerator for a vehicle is shown in FIG. 1 as an example of an accelerator for a vehicle wherein an accelerator according to a related art includes a pedal arm housing 1 that is fixed to a vehicle body panel under a driver seat, a pedal arm 2 one end of which is rotatably connected to the pedal arm housing 1, a pedal bracket 3 that is fixed to a floor panel under the driver seat, and a pedal pad 4 one end of which is rotatably hinged to the pedal bracket 3 and the other part of which is ball-jointed to the pedal arm 2. In addition, a spring plate 5 is connected to one end of the pedal arm 2 disposed within the pedal arm housing 1 wherein one end of a spring 6 is supported at the spring plate 5 and the other end thereof is supported at the pedal arm housing 1.

Accordingly, in the accelerator according to a related art as described in the above, the pedal effort is transmitted to the pedal pad 4 to compress the spring 6 when the pedal arm 2 rotates via a hinge shaft 7 with respect to the pedal arm housing 1. However, according to the accelerator of a related art, since the required spring 6 has an elastic coefficient of which is set in advance to meet safety regulations, it may be difficult to control the pedal effort without replacing the spring 6, and thus there is no method of actively controlling the pedal effort for an accelerator based on the locations of a driver seat.

The description provided above as a related art of the present invention is merely for helping to understand the background of the present invention and should not be construed as being included in the related art known by those skilled in the art.

SUMMARY

The present invention provides an active control method and system of a pedal effort for an accelerator based on the locations of a driver seat, through which improved acceleration performance may be ensured and a fatigue of a driver caused from an operation of the accelerator may be reduced.

An active control method of a pedal effort for an accelerator may include: determining whether a signal for varying the locations of a driver seat is generated when a vehicle turns on; and operating the pedal effort by varying the current pedal effort to a set target pedal effort in response to determining that the signal for varying the locations of a driver seat has been generated in the signal generation determining step.

The active control method of a pedal effort for an accelerator may further include determining whether a pedal effort control system is in a normal state when a vehicle turns on before the signal generation determining step. Furthermore, the active control method of a pedal effort for an accelerator may further include determining whether a pedal effort control is possible based on whether a vehicle is driven, in response to determining that the pedal effort control system is in a normal state in the pedal effort control system determining step.

The current pedal effort may be maintained as the existing pedal effort (right previous pedal effort) state, in response to determining that the signal for varying the locations of a driver seat has not been generated in the signal generation determining step.

The pedal effort control possibility determining step may be performed only in response to determining that the pedal control system is in a normal state, and the current pedal effort for an accelerator may be reset as an initial pedal effort in response to determining that the pedal effort control system is in an abnormal state in the pedal effort control system determining step.

The pedal effort control system may be determined to be in a normal state in the pedal effort control determining step when all conditions are satisfied wherein a voltage signal of a battery is normal (e.g., no battery failure has occurred), there is no signal for initiating the system pursuant to an urgent situation, and the signal for a pedal effort active control mode is generated.

The pedal effort control may be determined to be possible when a vehicle is not currently being driven and the pedal effort control system may be determined to not be possible when the vehicle is currently being driven in the pedal effort control possibility determining step.

The current pedal effort for an accelerator may be operated to a set average level when the driver seat is disposed in a range of middle locations along the seat track of the driver seat in the pedal effort control step. In addition, the current pedal effort for an accelerator may be operated to a lower set pedal effort when the driver seat is disposed in a range of front locations along the seat track of the driver seat in the pedal effort control step. Further, the current pedal effort for an accelerator may be operated to a higher set pedal effort when the driver seat is disposed in a range of rear locations along the seat track of the driver seat in the pedal effort control step.

BRIEF DESCRIPTION OF THE DRAWINGS

The above and other features of the present invention will now be described in detail with reference to exemplary embodiments thereof illustrated the accompanying drawings which are given herein below by way of illustration only, and thus are not limitative of the present invention, and wherein.

Figure 1:
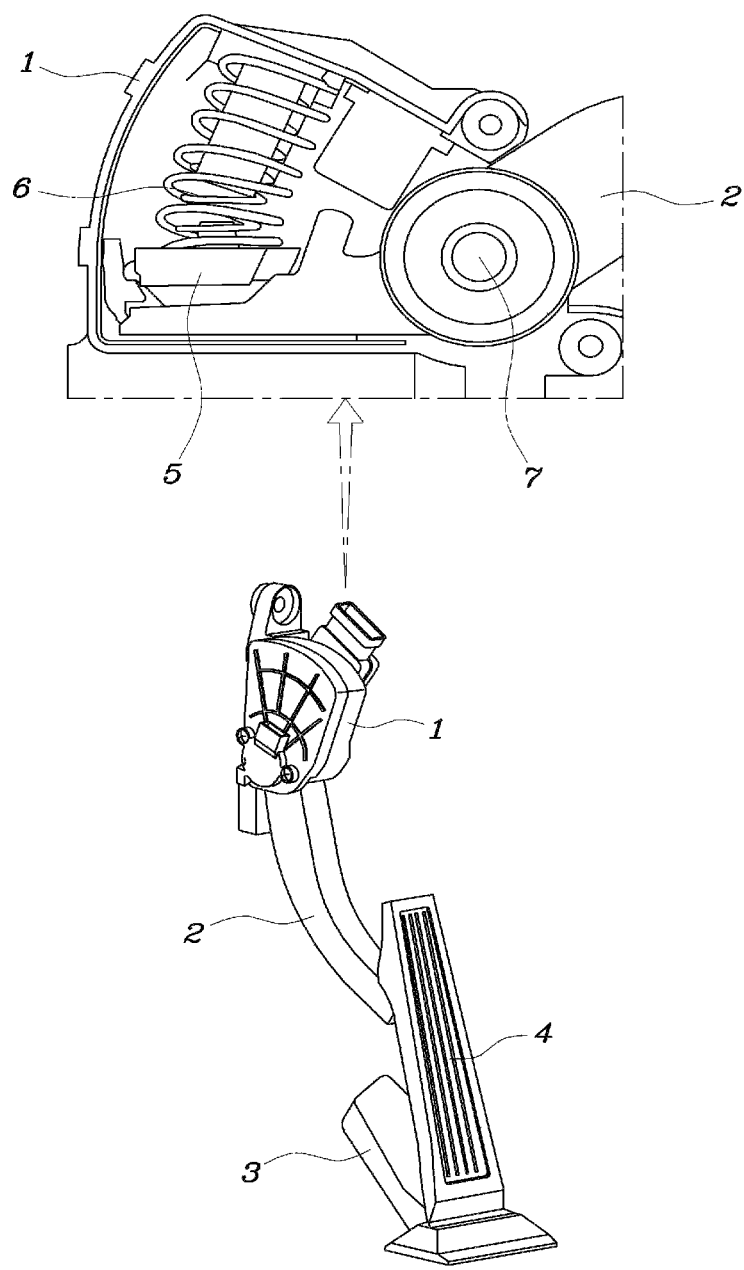
FIG. 1 is an exemplary view illustrating an accelerator not having a pedal effort control function according to a related art.
Figure 2:
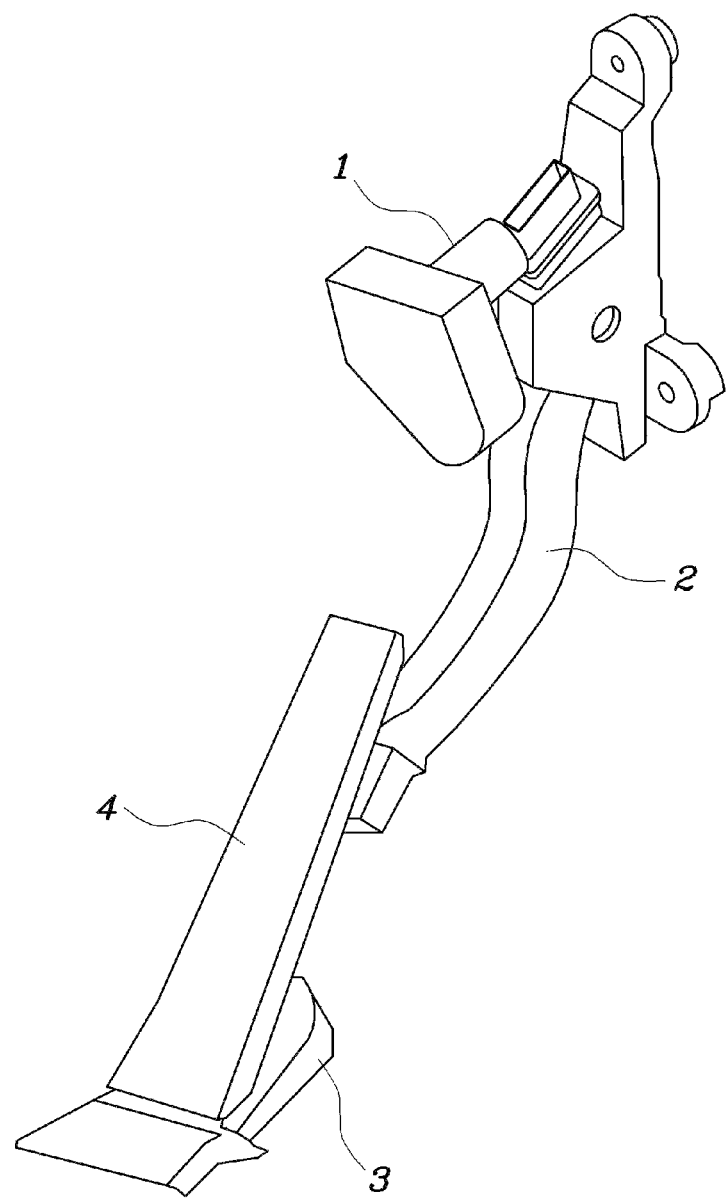
FIGS. 2 to 5 are exemplary views illustrating an accelerator having a pedal effort control function according to an exemplary embodiment of the present invention, respectively.

It should be understood that the accompanying drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

An accelerator for a vehicle having a pedal effort control function may include, as shown in FIGS. 2 to 5, a pedal arm housing 1 fixed to a vehicle body panel under a driver seat, a pedal arm 2 one end of which is rotatably connected to the pedal arm housing 1, a pedal bracket 3 fixed to a floor panel under the driver seat, and a pedal pad 4 one end of which is rotatably hinged to the pedal bracket 3 and the other end of which is ball-jointed to the pedal arm 2. In addition, a spring plate 5 may be connected to one end of the pedal arm 2 disposed within the pedal arm housing 1 and the pedal arm 2 may be rotatably connected to the pedal arm housing 1 via a hinge shaft 7.

Figure 3:
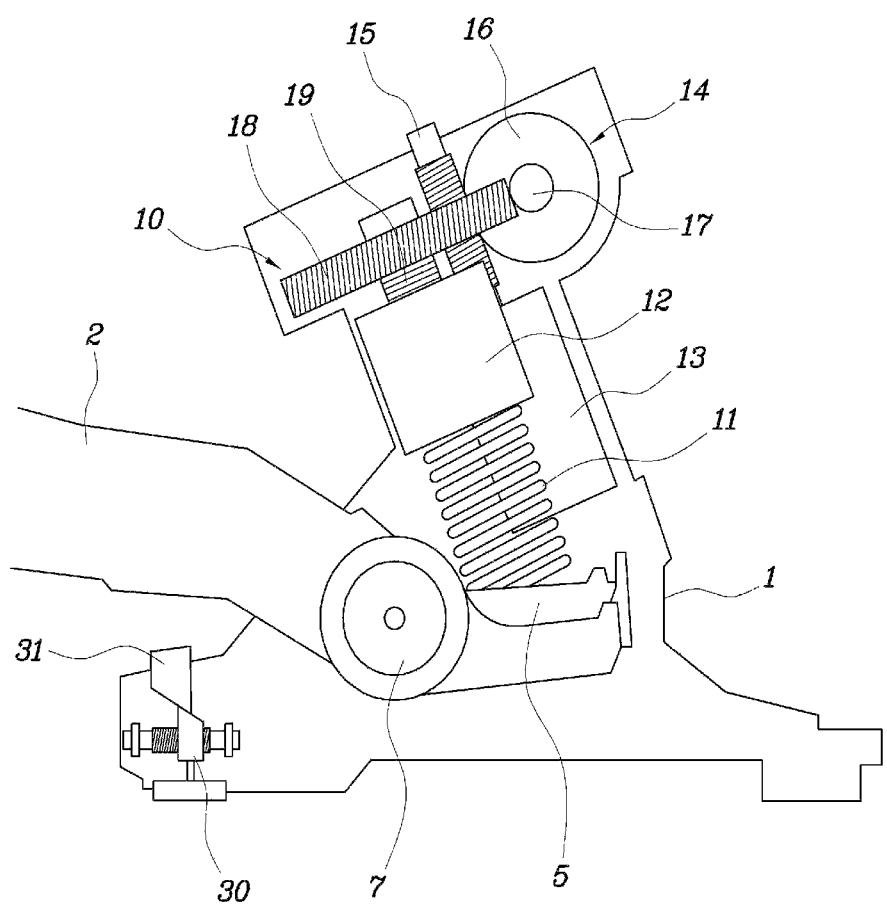
Figure 4:
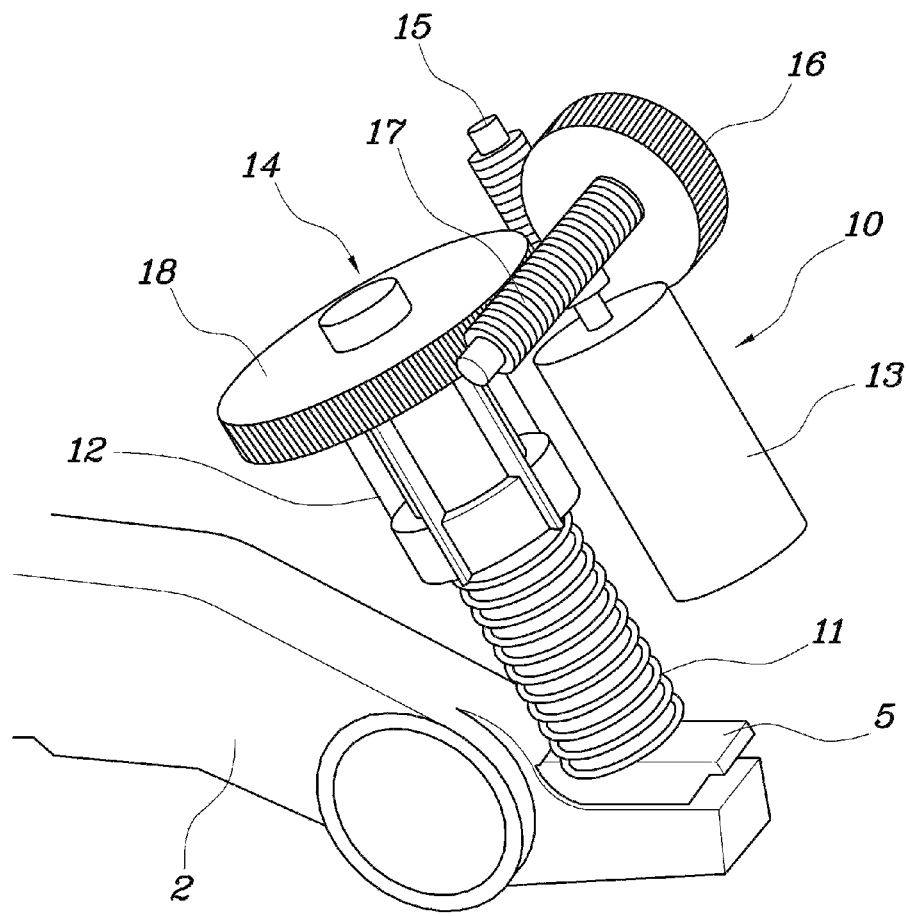
Figure 5:
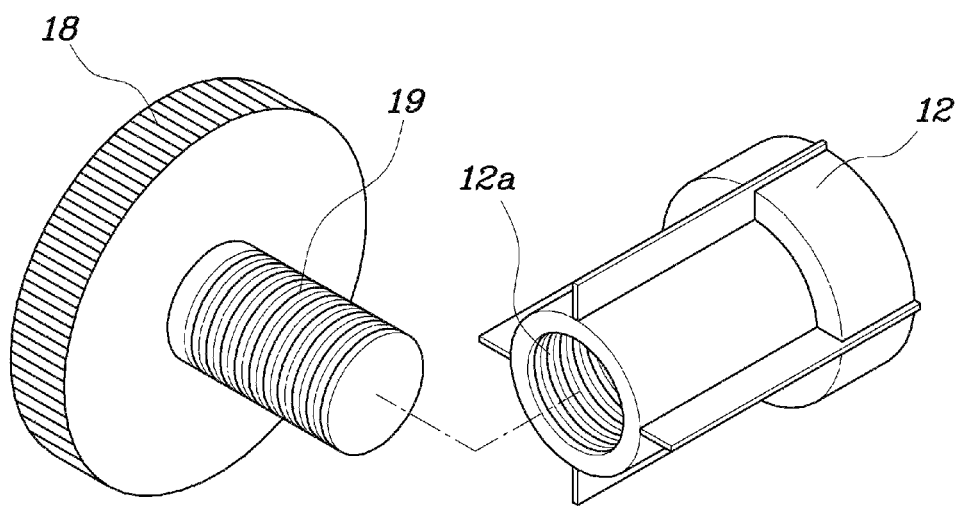

An accelerator according to an embodiment of the present invention may include a pedal effort control module 10 wherein the pedal effort control module 10 may include: a spring 11 one end of which is supported on an end of the pedal arm 2 disposed within the pedal arm housing 1; a spring fixing block 12 configured to support the other end of the spring 11; a motor 13 fixed to the pedal arm housing 1; and a power transmission mechanism 14 configured to transmit power from the motor 13 to the spring fixing block 12 and move the spring fixing block 12 to vary a length of the spring 11. In particular, the spring 11 may be supported directly on one end of the pedal arm 2, or the lower part of the spring 11 may be supported on the spring plate 5 connected to one end of the pedal arm 2 disposed within the pedal arm housing 1, as shown in FIGS. 3 and 4.

Accordingly, when the pedal arm 2 rotates around the hinge shaft 7, the spring 11 may be compressed and elastically deformed between the spring plate 5 and the spring fixing block 12 and the pedal effort may be provided to the pedal pad 4 via the pedal arm 2.

The power transmission mechanism 14 may be configured to connect the motor 13 and the spring fixing block 12 to transmit power from the motor 13 to the spring fixing block 12 wherein the power transmission mechanism 14 may include a first worm gear 15 integrally coupled to a shaft of the motor 13, a first worm wheel gear 16 meshed with the first worm gear 15, a second worm gear 17 integrally coupled to a center of the first worm wheel gear 16, a second worm wheel gear 18 meshed with the second worm gear 17, and a gear bolt 19 that integrally protrudes from a center of the second worm wheel gear 18 and on outer peripheral surface of which a plurality of threads may be disposed.

Furthermore, a plurality of screw grooves 12a may be disposed on an inner peripheral surface of the spring fixing block 12 to be screw fastened to the gear bolt 19 wherein when the second worm wheel gear 18 rotates, the spring fixing block 12 may move substantially straight (e.g., linearly) along the gear bolt 19 to vary a length of the spring 11 due to a movement of the spring fixing block 12 and thereby to vary a pedal effort.

Moreover, an operation of the motor 13 may be executed automatically by a controller (not shown) based on a driving condition, a driver's condition, a driving inclination of the driver, etc.

According to the accelerator provided with the pedal effort control module 10, the pedal effort of an accelerator may be varied actively by an execution of the controller in a start-on state of a vehicle based on the locations of a driver seat wherein when the driver seat is disposed in a range of middle locations along a seat track of the driver seat, the pedal effort may be executed to an average level, when the driver seat is disposed in a range of front locations along the seat track, the pedal effort may be varied to a lower level, and when the driver seat is disposed in a range of rear locations along the seat track, the pedal effort may be varied to a higher level. The average level of the pedal effort falls on a middle level between a lower level of the pedal effort and a higher level of the pedal effort.

Figure 6:
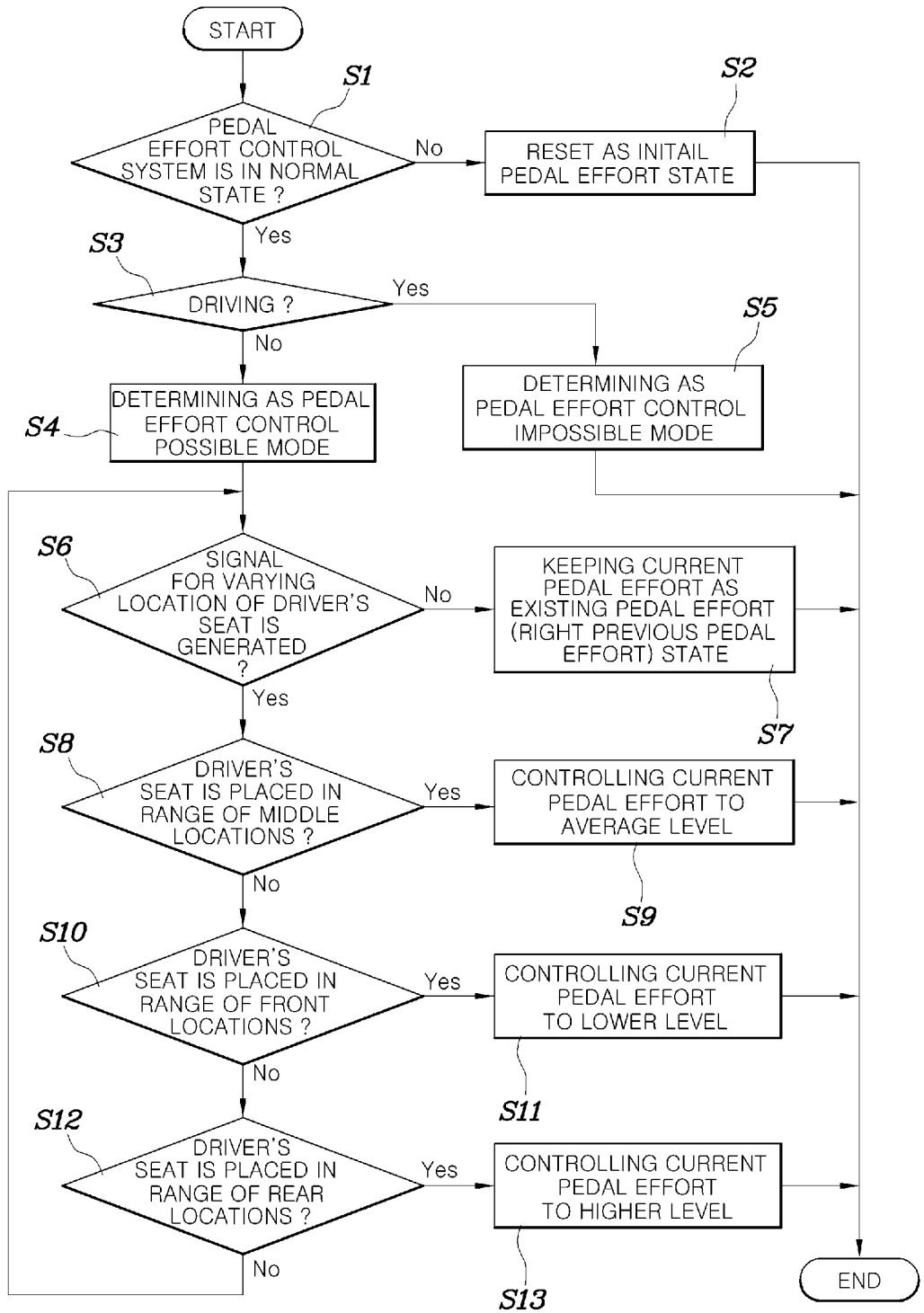
FIG. 6 is an exemplary flowchart illustrating a method of actively controlling the pedal effort for an accelerator having a pedal effort control function according to an exemplary embodiment of the present invention.

In other words, an active control method of a pedal effort for an accelerator according to an embodiment of the present invention, as shown in FIG. 6, may include: determining, by a controller, whether the pedal effort control system is in a normal state when a vehicle turns-on; determining, by the controller, whether the pedal effort control is controllable based on whether a vehicle is driven, in response to determining a normal state; determining, by the controller, whether a signal for varying the locations of a driver seat is generated, in response to determining whether the pedal effort control is controllable; and executing, by the controller, the pedal effort by varying current pedal effort to a target-pedal effort, when the signal for varying the locations of a driver seat has been determined to be generated.

Furthermore, only when the pedal effort control system is determined to be in a normal state, that is, when all conditions are satisfied wherein a voltage signal of a battery is normal, there is no signal for initiating the system pursuant to an urgent situation, and the signal for a pedal effort active control mode is generated, may the pedal effort control possibility determining step be performed.

Moreover, when the pedal effort control system is determined to be in an abnormal state, the current pedal effort for an accelerator may be reset as an initial pedal effort state. In particular, the initial pedal effort state refers to a reset state of the pedal effort.

Further, in determining the pedal effort control possibility, a pedal effort control may be determined to be possible only when a vehicle is currently not being driven, and a pedal effort control may be determined to not be possible due to safety concerns when the vehicle is being driven.

Moreover, in determining the signal generation, when the signal for varying the locations of the driver seat is not generated, the current pedal effort for an accelerator may be maintained as an existing pedal effort (e.g., right previous pedal effort) state. In addition, in determining the signal generation, in response to determining that the signal for varying the locations of a driver seat has been generated, and when the driver seat is disposed in a range of middle locations along a seat track of a driver seat, the current pedal effort for an accelerator may be operated to a set average pedal effort in the pedal effort control step. In other words, when a driver with a body condition of an average level, the driver seat may be operated to be disposed in a range of middle locations along the seat track, and the pedal effort may be operated to the set average pedal effort to improve operation feeling for the accelerator by the driver.

Further, when the driver seat is disposed in a range of front locations along the seat track (e.g., when the driver seat is moved further forward, departing from the range of middle locations along the seat track), the current pedal effort for an accelerator may be operated to a lower set pedal effort in the pedal effort control step. In other words, when a driver with a body condition of an average level or less, the driver seat may be operated to be disposed in a range of front locations along the seat track and the pedal effort for an accelerator may be operated to a lower set pedal effort to improve operation feeling for an accelerator.

Additionally, when the driver seat is disposed in a range of rear locations along the seat track (e.g., when the driver seat is moved further rearward, departing from the range of middle locations along the seat track), the current pedal effort for an accelerator may be operated to a higher set pedal effort in the pedal effort control step. In other words, when a driver with a body condition of an average level or more, the driver seat may be operated to be disposed in a range of rear locations along the seat track and the pedal effort for an accelerator may be operated to a higher set pedal effort to improve operation feeling for an accelerator.

Hereinafter, the operations of the present embodiment according to the present invention will be described, and an operation of a pedal effort for an accelerator will be described.

The motor 13 may be operated by a controller and power from the motor 13 may be transmitted to the spring fixing block 12 via the worm gears 15, 17, the worm wheel gears 16, 18 and the gear bolt 19, and then the spring fixing block 12 may move upward or downward (e.g., vertically) along the gear bolt 19 as in FIG. 3. When the spring fixing block 12 moves upward along the gear bolt 19 (e.g., to a receding direction from the spring plate), the spring 11 is lengthened via its elastic recovery, and the pedal effort for an accelerator may decrease due to the decreasing of spring force applying to the pedal arm 2. On the contrary, when the spring fixing block 12 moves downward along the gear bolt 19 (e.g., to an approaching direction to the spring plate), the spring 11 is shortened by being compressed, and the pedal effort for an accelerator may increase due to the increasing of spring force applying to the pedal arm 2.

The motor 13 may be configured to operate automatically with a controller (not shown) wherein, for example, when a driver seat is disposed in a range of middle locations along a seat track of the driver seat, the current pedal effort may be operated to an average level, when the driver seat is disposed in a range of front locations along the seat track of the driver seat, the pedal effort may be operated to be a lower level, and when the driver seat is disposed in a range of rear locations along the seat track of the driver seat, the pedal effort may be operated to be a higher level to further improve an acceleration property and fatigue caused from the operation of an accelerator by a driver may be reduced.

Further, the pedal effort may be operated to be a lower level in a substantially low speed driving (e.g., downtown driving) to reduce fatigue caused from an operation of an accelerator, and the pedal effort may be operated to be a higher level in a substantially high speed driving (e.g., expressway driving) to reduce ankle fatigue of a driver by supporting the pedal constantly.

Furthermore, the pedal effort may be decreased to increase pedal operation on an uphill road and the pedal effort may be increased to decrease the pedal operation on a downhill road. In addition, the pedal effort may be increased to ensure safety when the vehicle is driven above a predetermined speed limit or in a safety mode and further the pedal effort may be operated in consideration of an age or condition of a driver.

Next, a method of actively controlling a pedal effort for an accelerator based on the locations of a driver seat will be described, referring to FIG. 6.

When a vehicle turns on, a controller may be configured to determine whether a pedal effort control system is in a normal state (step S1) wherein a normal state may be determined when all conditions are satisfied and a voltage signal of a battery is in a normal state (e.g., not battery failure has occurred), there is no signal for initiating the system pursuant to an urgent situation, and the signal for a pedal effort active control mode is generated.

In addition, the pedal effort control system may be determined to be in an abnormal state, when the voltage signal of a battery is less than about 9 V or more than about 16.5 V. When the pedal effort control system is determined to be in an abnormal state, the current pedal effort for an accelerator may be reset as the initial pedal effort state (step S2).

When the pedal effort control system is determined to be in a normal state, the controller may be configured to determine whether a vehicle is being driven (step S3). In addition, the controller may be configured to determine whether the pedal effort control is possible when the vehicle is not being driven (step S4). Further, the controller may be configured to determine that the pedal effort control is not possible due to safety concerns when the vehicle is driven and then may be configured to forcibly terminate the pedal effort control logic (step S5).

Furthermore, the controller may be configured to control whether the signal for varying the location of a driver seat has been generated in response to determining the pedal effort is possible (step S6), and may be configured to determine whether the current location of a driver seat has been varied. In particular, the controller may be configured to perform a logic to vary the pedal effort to a set target pedal effort based on the location of a driver seat, in response to determining that the signal that varies the location of a driver seat has been generated, and the controller may be configured to maintain the current pedal effort as the existing pedal effort (e.g., right previous pedal effort) in response to determining that the signal that varies the location of a driver seat has not been generated (step S7).

Moreover, when the controller performs the logic that the signal for varying the location of a driver seat is generated and as a result the pedal effort for an accelerator is varied to a set target pedal effort, the pedal effort may be operated in three categories based on the locations of the driver seat.

When the driver seat is disposed in a range of middle locations along the seat track of a driver seat, body conditions of the driver generally may be determined to be average levels (step S8). Generally, a driver whose body conditions are determined to be average levels operates the driving seat in a range of middle locations along a seat track of a driver seat to maintain comfortable traveling wherein the pedal effort for an accelerator may be operated to a set average level to improve operation feeling for an accelerator according to another embodiment of the present invention (step S9). In general, the average level body condition means a body condition of persons having a body size which falls on an average body size among people living in a nation or a specific area and using a vehicle.

When the driver seat is disposed in a range of front locations along the seat track of a driver seat (step S10), the driver body conditions may be average levels or less. The driver may operate the driving seat to a range of front locations along a seat track of a driver seat, and the pedal effort for an accelerator may be operated to be a lower set pedal effort to improve operation feeling for an accelerator (step S11).

When the driver seat is disposed in a range of rear locations along the seat track of a driver seat (step S12), the driver body conditions may be average levels or more. The driver may operate the driving seat to a range of rear locations along a seat track of a driver seat, and the pedal effort for an accelerator may be operated to a higher set pedal effort to improve operation feeling for an accelerator (step S13).

As described above, when the controller determines the driver body condition based on the locations of driver seat and operates the pedal effort for an accelerator to be varied pursuant to the body condition of the driver when the vehicle turns on, drivers may ensure improved strokes for an accelerator to ensure improved acceleration performance, and to reduce fatigue caused from an operation of an accelerator.

As described above, under the accelerator according to an embodiment of the present invention, a length of the spring 11 may be varied by the movement of the spring fixing block 12 via the operation of the motor 13 without separately replacing components to vary the pedal effort for satisfying safety regulations with respect to the pedal effort for an accelerator regardless of a vehicle type. Further, the fatigue caused from the operation of an accelerator may be reduced by varying actively the pedal effort for an accelerator based the locations of a driver seat.

The invention has been described in detail with reference to exemplary embodiments thereof. However, it will be appreciated by those skilled in the art that changes may be made in these embodiments without departing from the principles and spirit of the invention, the scope of which is defined in the accompanying claims and their equivalents.

What is claimed is:

1. An active control method of a pedal effort for an accelerator, comprising:
   determining, by a controller, whether a signal for varying locations of a driver seat is generated when a vehicle turns on;
   operating, by the controller, the pedal effort by varying a current pedal effort to a set target pedal effort in response to determining that the signal for varying the locations of the driver seat has been generated;
   determining, by the controller, whether a pedal effort control system is in a normal state when a vehicle turns on before determining whether the signal for varying the locations of the driver seat has been generated; and
   determining, by the controller, whether a pedal effort control is possible based on whether a vehicle is being driven in response to determining that the pedal effort control system is in a normal state.

2. The active control method of a pedal effort for an accelerator of claim 1, wherein the current pedal effort is maintained as an existing pedal effort in response to determining that the signal for varying the locations of a driver seat has not been generated.

3. The active control method of a pedal effort for an accelerator of claim 1, wherein determining whether the pedal effort is possible, is performed only in response to determining that the pedal control system is in a normal state, and the current pedal effort for an accelerator is reset as an initial pedal effort in response to determining that the pedal effort control system is in an abnormal state.

4. The active control method of a pedal effort for an accelerator of claim 1, wherein when conditions are satisfied showing that a voltage signal of a battery is normal, no signal for initiating the pedal effort control system pursuant to an urgent situation is generated, and a signal for a pedal effort active control mode is generated, the pedal effort control system is determined to be in a normal state.

5. The active control method of a pedal effort for an accelerator of claim 1, wherein a pedal effort control is possible when a vehicle is not being driven and a pedal effort control is not possible when the vehicle is being driven.

6. The active control method of a pedal effort for an accelerator of claim 1, wherein the current pedal effort for an accelerator is operated to a set average level when the driver seat is disposed in a range of middle locations along a seat track of the driver seat.

7. The active control method of a pedal effort for an accelerator of claim 1, wherein the current pedal effort for an accelerator is operated to a lower set pedal effort when the driver seat is disposed in a range of front locations along a seat track of the driver seat.

8. The active control method of a pedal effort for an accelerator of claim 1, wherein the current pedal effort for an accelerator is operated to a higher set pedal effort when the driver seat is disposed in a range of rear locations along a seat track of the driver seat.

9. An active control system of a pedal effort for an accelerator, comprising:
   a controller configured to:
      determine whether a signal for varying locations of a driver seat is generated when a vehicle turns on;

operate the pedal effort by varying a current pedal effort to a set target pedal effort in response to determining that the signal for varying the locations of the driver seat has been generated;

determine whether a pedal effort control system is in a normal state when a vehicle turns on before determining whether the signal for varying the locations of the driver seat has been generated; and determine whether a pedal effort control is possible based on whether a vehicle is being driven in response to determining that the pedal effort control system is in a normal state.

10. The active control system of claim 9, wherein the current pedal effort is maintained as an existing pedal effort in response to determining that the signal for varying the locations of a driver seat has not been generated.

11. An active control apparatus having a pedal effort control function, comprising
a pedal effort control module controller,
pedal arm disposed within the pedal arm housing;
a motor fixed to the pedal arm housing;
a power transmission mechanism configured to transmit power from the motor,
wherein the pedal effort control module controller is configured to:
determine whether a signal for varying locations of a driver seat is generated when a vehicle turns on;
operate the pedal effort by varying a current pedal effort to a set target pedal effort in response to determining that the signal for varying the locations of the driver seat has been generated;
determine whether a pedal effort control system is in a normal state when a vehicle turns on before determining whether the signal for varying the locations of the driver seat has been generated; and
determine whether a pedal effort control is possible based on whether a vehicle is being driven in response to determining that the pedal effort control system is in a normal state.

12. The active control apparatus of claim of claim 11, wherein the current pedal effort is maintained as an existing pedal effort in response to determining that the signal for varying the locations of a driver seat has not been generated.

13. The active control apparatus of claim 12, wherein the pedal effort control module controller is configured to determine whether the pedal effort is possible, is performed only in response to determining that the pedal control system is in a normal state, and the current pedal effort for an accelerator is reset as an initial pedal effort in response to determining that the pedal effort control system is in an abnormal state.

14. The active control apparatus of claim 11, wherein when conditions are satisfied showing that a voltage signal of a battery is normal, no signal for initiating the pedal effort active control system pursuant to an urgent situation is generated, and a signal for a pedal effort active control mode is generated, the pedal effort control system is determined to be in a normal state.

* * * * *